United States Patent [19]

Chen et al.

[11] Patent Number: 5,031,665
[45] Date of Patent: Jul. 16, 1991

[54] CURVED PIPE SECTION HAVING REFRACTORY LINING AND CENTRAL SECTION OF FLEXIBLE INSULATING MATERIAL

[75] Inventors: Te-Hung Chen, Florham Park, N.J.; Dominic Cicchino, Brockenhurst, England

[73] Assignee: Exxon Research and Engineering Company, Florham Park, N.J.

[21] Appl. No.: 599,597

[22] Filed: Oct. 18, 1990

Related U.S. Application Data

[63] Continuation-in-part of Ser. No. 304,073, Jan. 31, 1989, abandoned.

[51] Int. Cl.$^5$ ............................ F16L 9/14; F16L 59/14
[52] U.S. Cl. ................................. 138/149; 138/147; 138/DIG. 8
[58] Field of Search ............... 138/110, 149, 147, 172, 138/DIG. 8; 285/47, 179; 432/234, 233, 235

[56] References Cited

U.S. PATENT DOCUMENTS

| | | | |
|---|---|---|---|
| Re. 18,785 | 4/1933 | Currie . | |
| 1,894,371 | 1/1933 | Fender | 138/147 |
| 2,451,146 | 10/1948 | Baker et al. | 138/149 |
| 2,933,917 | 4/1960 | Sampson . | |
| 3,870,346 | 3/1975 | Kappler et al. | 138/149 |
| 3,882,382 | 5/1975 | Johnson | 138/149 |
| 4,061,162 | 12/1977 | Jones et al. . | |
| 4,063,344 | 12/1977 | Jones et al. . | |
| 4,073,318 | 2/1978 | Close et al. | 138/149 |
| 4,140,484 | 2/1979 | Payne . | |
| 4,155,377 | 5/1979 | Suzuke et al. | 138/149 |
| 4,284,106 | 8/1981 | Haas et al. . | |
| 4,363,504 | 12/1982 | De Feo et al. . | |
| 4,428,730 | 1/1984 | Holmes et al. | 138/149 |
| 4,522,432 | 6/1985 | Press . | |
| 4,677,731 | 7/1987 | Sommerer et al. . | |
| 4,684,155 | 8/1987 | Davis . | |
| 4,732,177 | 3/1988 | Maus et al. | 138/149 |

Primary Examiner—James E. Bryant, III
Attorney, Agent, or Firm—Joseph J. Dvorak

[57] ABSTRACT

One embodiment of the present invention is an insulated curved metal pipe characterized by a curved body of a given length having a first section, a central section and an end section. The body has a monolithic refractory lining extending for the length of the body which is in contact with the internal surface of the first section and second section and which is spaced apart from the internal surface of the central section by a flexible insulating material, whereby the insulated curved pipe has greater flexibility (i.e., less stiffness) than otherwise possible when the cast refractory is in contact with the internal surface of the entire curved body. The curved pipe also includes a plurality of anchors attached to the internal surface of the curved body. Importantly, the anchors in the central section are sufficiently flexible to permit at least some deformation of the central section of the body relative to the refractory.

8 Claims, 2 Drawing Sheets

CURVED PIPE SECTION HAVING REFRACTORY LINING AND CENTRAL SECTION OF FLEXIBLE INSULATING MATERIAL

CROSS REFERENCE TO RELATED APPLICATIONS

This application is a Continuation-in-Part of U.S. application Ser. No. 304,073, filed Jan. 31, 1989, now abandoned.

FIELD OF THE INVENTION

This invention relates to improvements in internally insulated curved pipe sections.

BACKGROUND OF THE INVENTION

There are many known processes in which high temperature gases or high temperature fluidized solids are transported through piping systems. For example, in fluid catalytic cracking processes, many of the piping systems employed for transporting gases and fluidized solids from the reactor to the regenerator unit and back are exposed to gases and fluidized solids at temperatures that are in the range of about 500° C. to about 900° C. and have pressures in the range of about 1 to 4 atmospheres. These piping systems are internally insulated with a refractory lining which is either gun-applied or cast in place. In curved pipe sections like elbows, the internal refractory lining layer adds very high stiffness to the curved section, preventing its ovalization and characteristic flexibility, with the result that high unaccounted-for piping loads predispose the piping system to component failures.

Accordingly, the object of the present invention is to provide an internally insulated curved pipe section in which the refractory lining is retained in position, but substantially mechanically decoupled from the curved pipe so that the inherent flexibility of the curved pipe is not significantly affected.

SUMMARY OF THE INVENTION

One embodiment of the present invention is an insulated curved metal pipe characterized by a curved body of a given length having a first section, a central section and an end section. The body has a monolithic refractory lining extending for the length of the body which is in contact with the internal surface of the first and second section and which is spaced apart from the internal surface of the central section by a flexible insulating material, whereby the insulated curved pipe has greater flexibility (i.e., less stiffness) than otherwise possible when the cast refractory is in contact with the internal surface of the entire curved body. The curved pipe also includes a plurality of anchors attached to the internal surface of the curved body. Importantly, the anchors in the central section are sufficiently flexible to permit at least some deformation of the central section of the body relative to the refractory.

In a particularly preferred embodiment of the present invention, an internally insulated pipe elbow is provided comprising a metal pipe elbow having a cast refractory lining on the internal surface of the elbow and a flexible ceramic fiber insulating material interposed between the castable refractory and the internal surface of the elbow only in substantially the central portion of the elbow.

The various advantages of the internally insulated curved pipe section of the present invention will be apparent from the following detailed description, together with the accompanying drawings, which are submitted for purposes of illustration and are not intended to limit the scope of the invention.

DETAILED DESCRIPTION OF THE INVENTION

The principles of the present invention are useful for internally insulated curved metal pipes; i.e., metal pipes that have a curved centerline, such as elbows, U-bends and the like. For convenience, the invention will be described in detail in connection with 90° elbows, such as that shown in FIG. 1.

Figure 1:
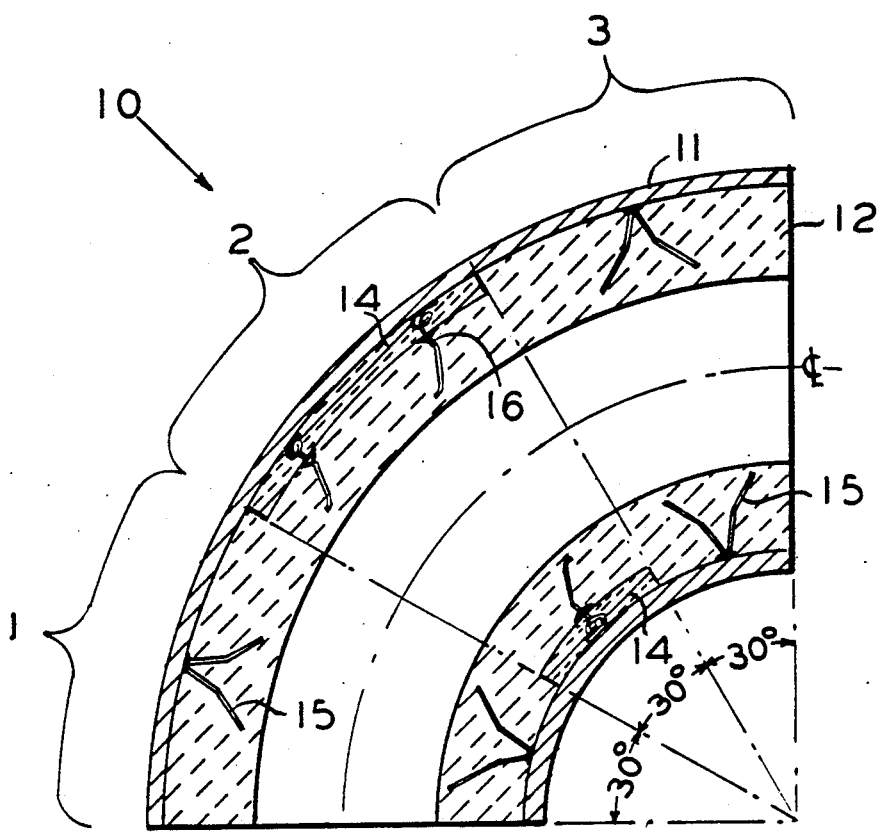
FIG. 1 is a sectional view of a 90° pipe elbow insulated in accordance with the principles of the present invention.

Referring to FIG. 1, a curved insulated pipe or elbow 10 consists of a cylindrical metal body 11, of a given length, which is fabricated from any suitable metal, but typically will be fabricated from steel, like carbon steel. As shown in FIG. 1, the cylindrical body 11 is bent or curved to form a 90° elbow. The body 11 is conveniently divided into first and second sections defining radially extending legs 1 and 3, respectively, and a central section or bight 2. These sections need not be equal in size; however, it is preferred that sections 1 and 3 are substantially equal in size, and it is particularly preferred that all three sections are substantially equal in size.

Elbow 10 has a monolithic refractory lining 12 that extends for the entire length of body 11. The refractory lining 12 may be made from any of the well known refractory materials used for insulating internal surface of pipes that are to be exposed to high temperature gases and hot fluidized solids. An example of such refractory materials is an alumina-silica refractory material. Indeed, in the practice of the present invention, it is particularly preferred that refractory lining 12 be formed from one of the commercially available, castable, medium weight, alumina-silica refractory materials.

As can be seen from FIG. 1, the refractory lining 12 is in contact with the internal surface of the first and second end sections 1 and 3 of the body 11, but is spaced apart from the internal surface of the central section 2 of the body 11. This spacing is achieved by use of a flexible insulating material 14 which is interposed between the monolithic refractory lining 12 and the interior surface of the body 11 in the central section 2 of the body.

As shown in FIG. 1, elbow 10 has the flexible insulating material 14 on the interior surface of the body 11 and extending lengthwise for distance less than the length of the body 11, but extending substantially equidistant from the mid-point of the body 11. Thus, flexible insulating material 14 is positioned only in the central section 2 of the body 11.

In the embodiment shown in FIG. 1, central section 2 is equal in length to first and end sections 1 and 3, respectively. This is particularly preferred, but not necessary. Other lengths may be selected, depending upon the degree of flexibility that is required for a specific piping system application. In general, the length of the central section 2 will be sufficient to provide a monolithic, refractory lined, curved pipe having a stiffness of from about 55% to about 200%, and preferably from about 75% to about 175%, of the stiffness of the same curved pipe if it were not lined with a monolithic refractory lining.

The flexible insulating material 14 can be one of any number of well known blankets, boards or the like. Such materials generally consist of ceramic fibers, like alumina-silica fibers.

Figure 2:
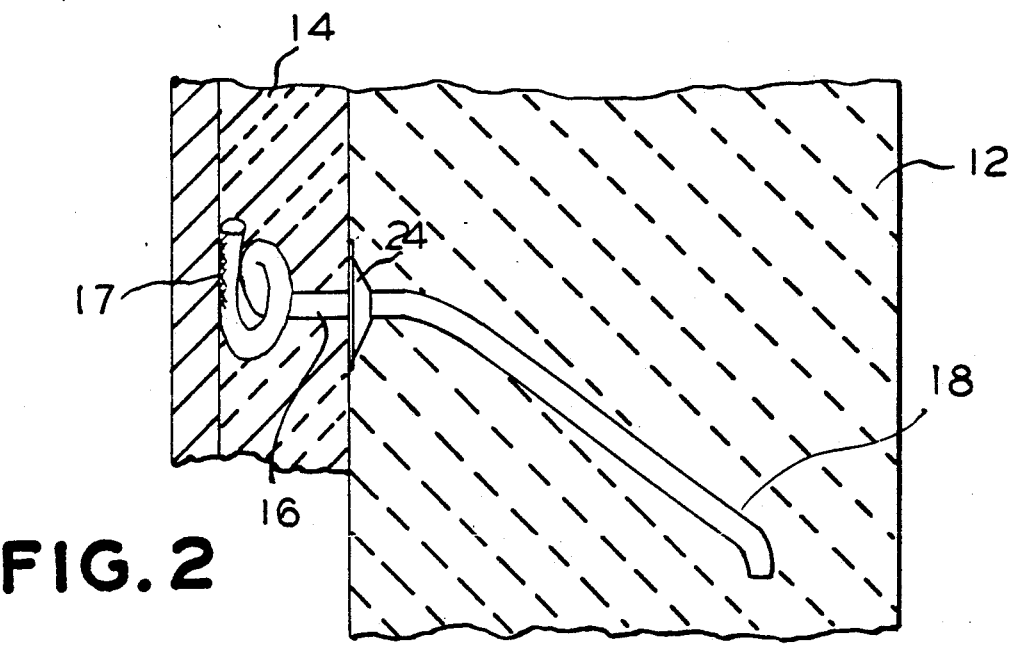
FIG. 2 is an enlarged sectional detailed partial view of the anchoring stud preferred for retaining the flexible insulating material in position in accordance with the present invention.

As is known in the art, anchors are provided on the internal surface of refractory lined elbows so as to retain the refractory lining in place. Thus, V-shaped anchors 15, shown in FIG. 1, are welded to the internal surface of body 11 in the first and end sections 1 and 3 of the elbow. Importantly, the anchors in the central section 2 of the curved body 11 are sufficiently flexible to permit sufficient deflection of the body 11 in the central section 2 relative to the refractory lining 12, so the anchors do not substantially increase the stiffness of the curved pipe over that in their absence. Especially preferred anchors, as shown in FIG. 2, consist of a radially inwardly extending stud 16 having a first end 17 which is welded to the internal surface of body 11. At about mid-point, stud 16 bends at an angle of from about 30° to about 60° and, preferably, at about 45° from a line normal to the point of attachment of stud 16 to the wall of body 11. The second end 18 of stud 16 is sufficiently long so as to extend into the refractory lining 12. Optionally and preferably, stud 16 is coiled at a point between the mid-point and the first end 17. A press-on clip 24 is provided for retaining the flexible material 14 in position.

In forming the internally insulated pipe elbow, the flexible ceramic insulating material 14 is impaled over studs 16 located in the center section 2 of the elbow. Optionally, but preferably, the flexible material 14 is held in place by means of a press-on clip 24. Then, the rigid monolithic refractory lining 12 is vibration cast into the annulus of the elbow for its entire length.

Figure 3:
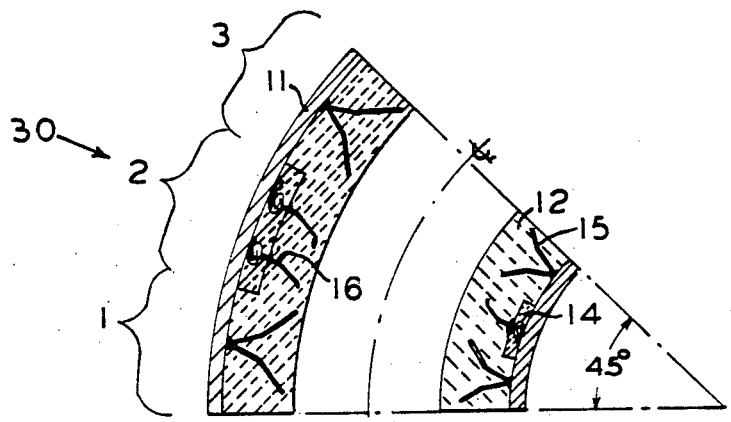
FIG. 3 is a sectional view of a 45° pipe elbow insulated in accordance with this invention.

Referring now to FIG. 3, there is shown a 45° elbow 30 having three sections of equal length, first and end sections 1 and 3 and a central section 2. As can be seen, elbow 30 has a refractory lining 12 in the interior of the elbow and continuing for its entire length. Importantly, however, a flexible insulating material 14 is positioned between the inner surface of the elbow and the refractory lining 12 in the central section 2 of the elbow. The flexible single-tine anchors 16 with their second end 18 (shown in detail in FIG. 2) are provided in central section 2 of elbow 30. Also shown are anchors 15.

Figure 4:
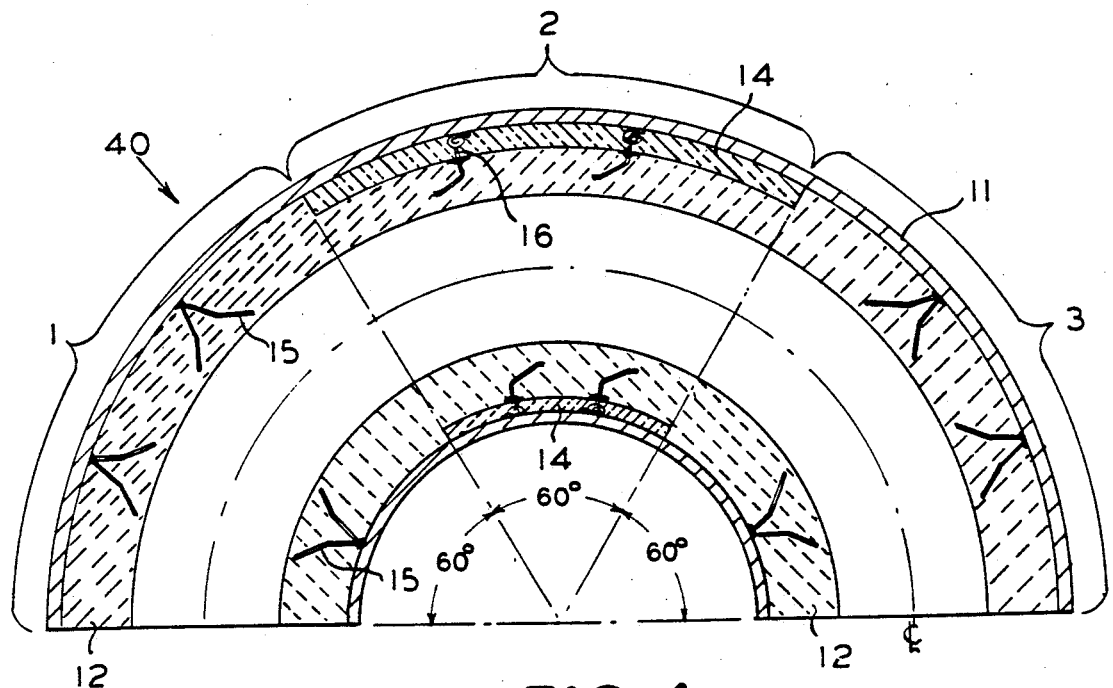
FIG. 4 is a sectional view of a 180° curved pipe section insulated according to this invention.

A similar arrangement is shown in FIG. 4 for a 180° curved pipe 40. Three sections are shown. There are first and end sections 1 and 3 and central section 2. A monolithic refractory lining 12 has been cast in the annulus of pipe 40; however, flexible insulation 14 is positioned between the pipe 40 and refractory lining 12 in central section 2 of the curved pipe 40. The flexible single-tine anchors 16, one of which is shown in detail in FIG. 2, are provided in the central section 2 of pipe 40. In FIG. 4, the anchor 16 with its second end 18 are referenced. Refractory anchors 15 also are shown.

The unique combination of flexible insulating lining and flexible refractory anchors in the central section of a curved pipe having a monolithic refractory lining within, mechanically decouples the metal of the curved pipe from the refractory lining in the critical ovalization area, thereby significantly reducing refractory lined elbow stiffness. This permits the elbow to possess sufficient flexibility to satisfy thermal expansion requirements for piping system employing such an elbow.

What is claimed is:

1. A refractory lined curved pipe section of reduced stiffness defining a bight and radially extending legs comprising:
    a curved body having a first end and a second end section defining said legs and a central section defining said bight;
    a monolithic refractory lining extending the length of the body and in contact with the interior of the body in the first section and second section and spaced apart from the interior of the body in the central section;
    a flexible insulating material positioned between the monolithic refractory lining and the interior of the body only in the central section of the body, whereby the curved pipe section has a stiffness less than the stiffness of substantially the same curved pipe, but having the monolithic refractory in contact with the entire interior of the curved body.

2. The pipe section of claim 1 including a plurality of refractory anchors attached to the wall of the central section of the curved body, the anchors extending into the refractory lining in the central section, and having sufficient flexibility to permit at least some deflection of the central section of the curved body relative to the refractory.

3. The pipe section of claim 2 including a stud positioned normal to the interior of the central section, and each of the anchors has a single tine extending into the refractory lining at an angle of from about 30° to about 60° from said stud.

4. The curved pipe section of claim 3 wherein the stud is coiled at a point between the interior of the central section and the tine.

5. The pipe section of claim 4 wherein the first section and the second section are equal in length.

6. The pipe section of claim 5 wherein the central section is equal in length to the first section and the second section.

7. A refractory lined curved pipe section defining a bight and radially extending legs comprising:
    a curved metal body with an interior wall, the curved body having a first end and a second end defining said legs, and a central section defining said bight, each of which are substantially equal in length;
    a monolithic refractory lining within the body and extending for the entire length thereof, the refractory lining contacting the interior wall of the curved body in the first section and second section, but being spaced apart from the interior wall in the central section;
    a flexible ceramic fiber insulating material positioned between the refractory lining and the pipe section in the central section of the curved body; and a plurality of single-tine refractory anchors attached to the interior wall of the central section, each anchor extending radially inwardly into the refractory layer and then at an angle of from about 30° to about 60° from the radially inwardly extending portion, the central section of the metal body is permitted to move relative to the refractory layer, thereby permitting sufficient flexibility to satisfy thermal expansion requirements in piping systems employing refractory lined, curved pipe sections.

8. The pipe section of claim 7 wherein the radially inwardly extending portion of the anchor includes a coiled portion in the vicinity of attachment to the wall of the body.

* * * * *